(12) United States Patent
Pan

(10) Patent No.: US 11,737,598 B2
(45) Date of Patent: *Aug. 29, 2023

(54) AUTOMATIC MATERIAL POURING DEVICE OF FOOD FRYING MACHINES

(71) Applicant: O-VIEW Technology Co., Ltd., New Taipei (TW)

(72) Inventor: Chia-I Pan, New Taipei (TW)

(73) Assignee: O-VIEW TECHNOLOGY CO., LTD., New Taipei (TW)

( * ) Notice: Subject to any disclaimer, the term of this patent is extended or adjusted under 35 U.S.C. 154(b) by 543 days.

This patent is subject to a terminal disclaimer.

(21) Appl. No.: 16/890,591

(22) Filed: Jun. 2, 2020

(65) Prior Publication Data

US 2020/0375392 A1    Dec. 3, 2020

(30) Foreign Application Priority Data

Jun. 3, 2019   (TW) .................................. 108119243

(51) Int. Cl.
```
A47J 37/10    (2006.01)
A47J 37/04    (2006.01)
A47J 36/16    (2006.01)
A47J 36/32    (2006.01)
```
(52) U.S. Cl.
CPC ............ *A47J 36/165* (2013.01); *A47J 36/32* (2013.01); *A47J 37/047* (2013.01); *A47J 37/105* (2013.01); *A47J 37/106* (2013.01); *A47J 37/108* (2013.01); *A47J 2202/00* (2013.01)

(58) Field of Classification Search
CPC ....... A47J 37/047; A47J 37/105; A47J 37/108
See application file for complete search history.

(56) References Cited

U.S. PATENT DOCUMENTS

| 4,571,474 | A | * | 2/1986 | Pomroy | ............... | H05B 6/6411 |
| | | | | | | 219/389 |
| 9,693,654 | B2 | * | 7/2017 | Smith | ..................... | A47J 36/34 |

(Continued)

FOREIGN PATENT DOCUMENTS

| CN | 106419478 A | * | 2/2017 | | |
| CN | 106889870 A | * | 6/2017 | ............... | A47J 27/00 |

(Continued)

*Primary Examiner* — John J Norton
(74) *Attorney, Agent, or Firm* — Muncy, Geissler, Olds & Lowe, P.C.

(57) ABSTRACT

An automatic material pouring device of food flying machines is disclosed, comprising a machine body, a food flying pot, a material adding device and a master controller, in which the food flying pot and the material adding device are individually mounted on the machine body, and the material adding device includes a base and a movable seat which is used to place at least one material placement box, and the base is also further configured with a feeding cylinder and an attracting device, and the feeding cylinder and the attracting device are assembled together, and in which the master controller is used to control the feeding cylinder and the attracting device so as to control the feeding cylinder to roll and turn when the attracting device is attracted and attached to the material placement box thereby pouring the material accommodated inside the material placement box into the food flying pot.

6 Claims, 21 Drawing Sheets

(56) References Cited

U.S. PATENT DOCUMENTS

2015/0122133 A1* 5/2015 Zhang .................... A47J 37/10
99/407
2016/0106259 A1* 4/2016 Xu ......................... G07F 9/105
700/275

FOREIGN PATENT DOCUMENTS

CN 109730523 A * 5/2019
JP 2006061183 A * 3/2006

* cited by examiner

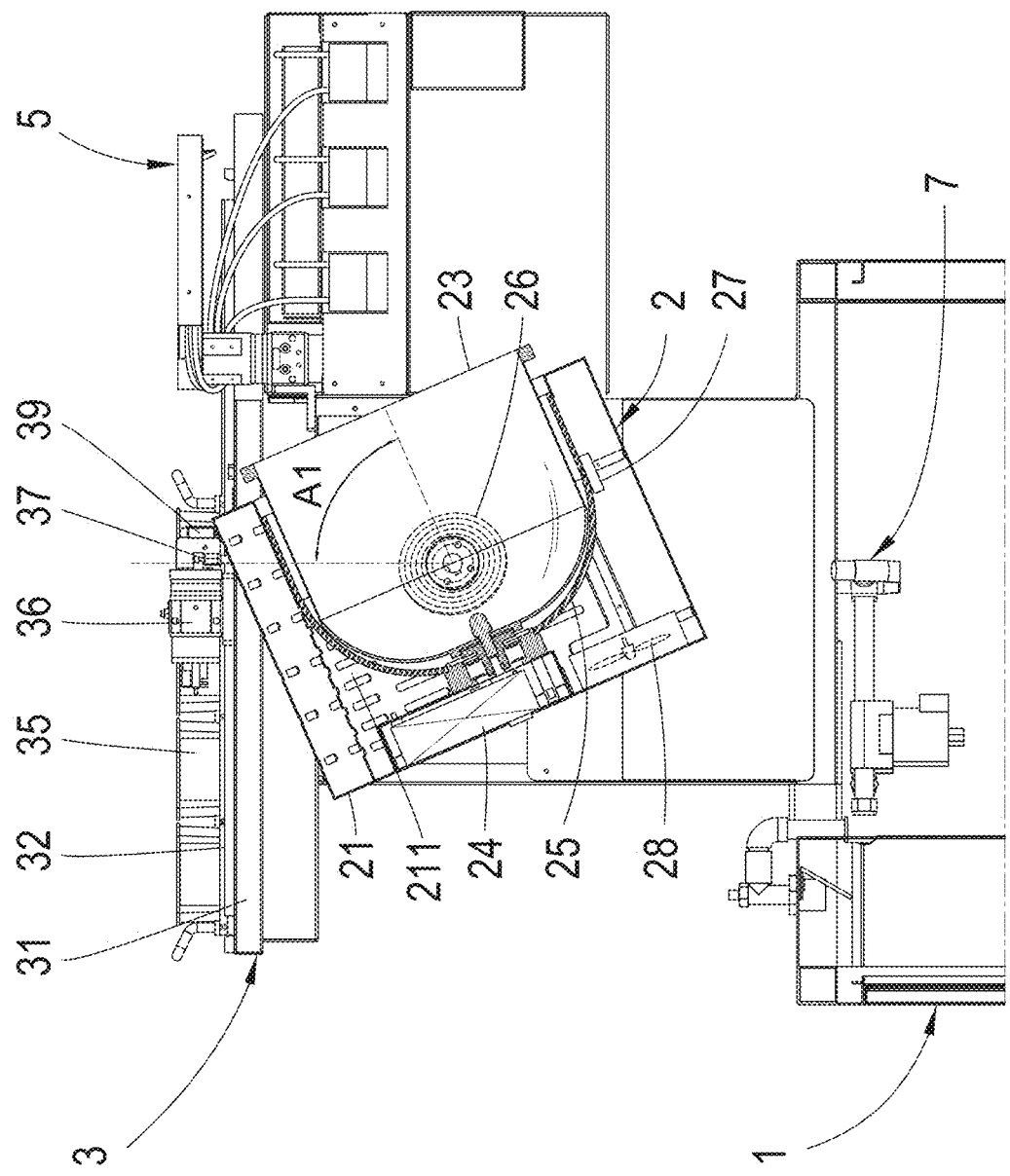

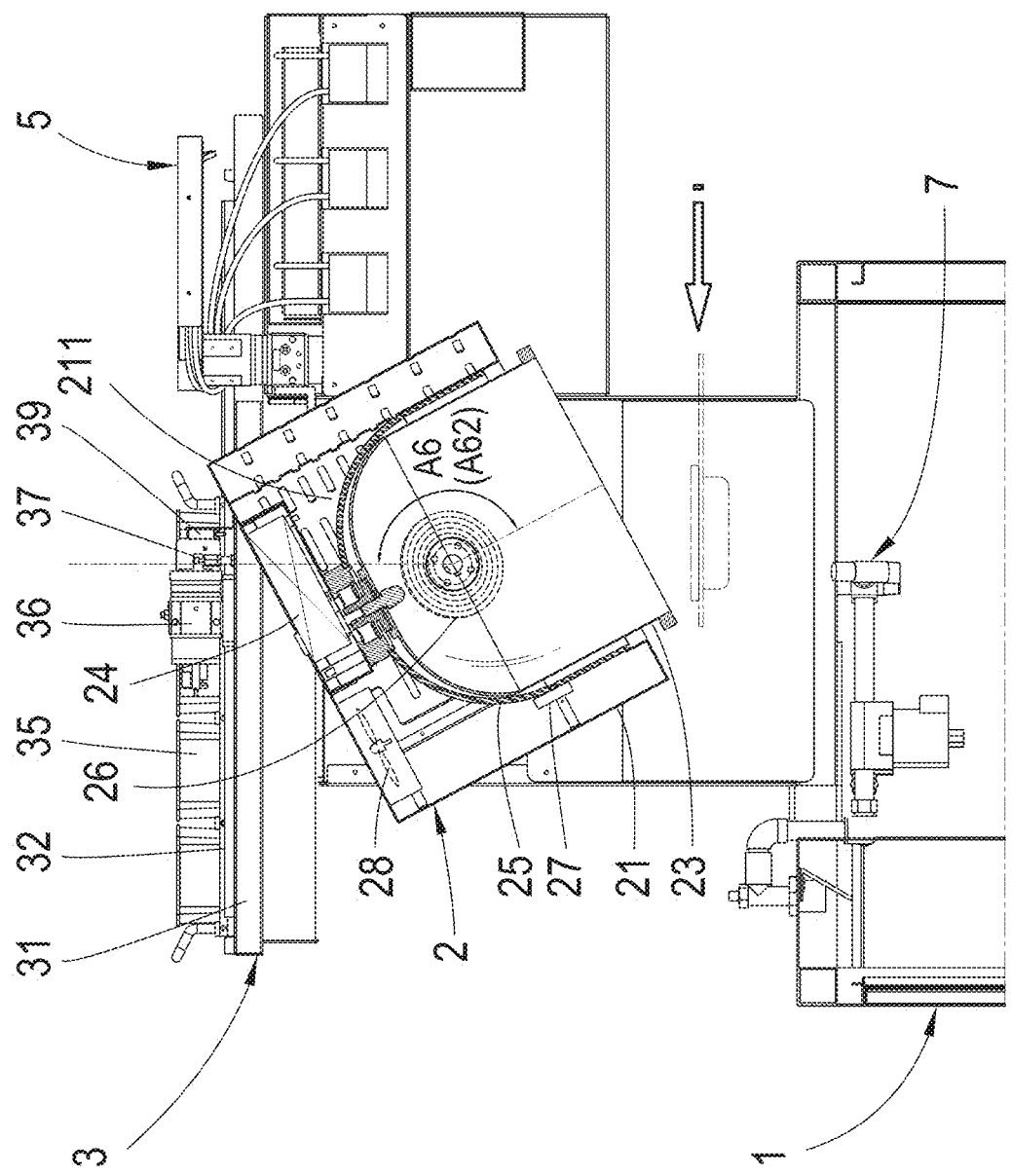

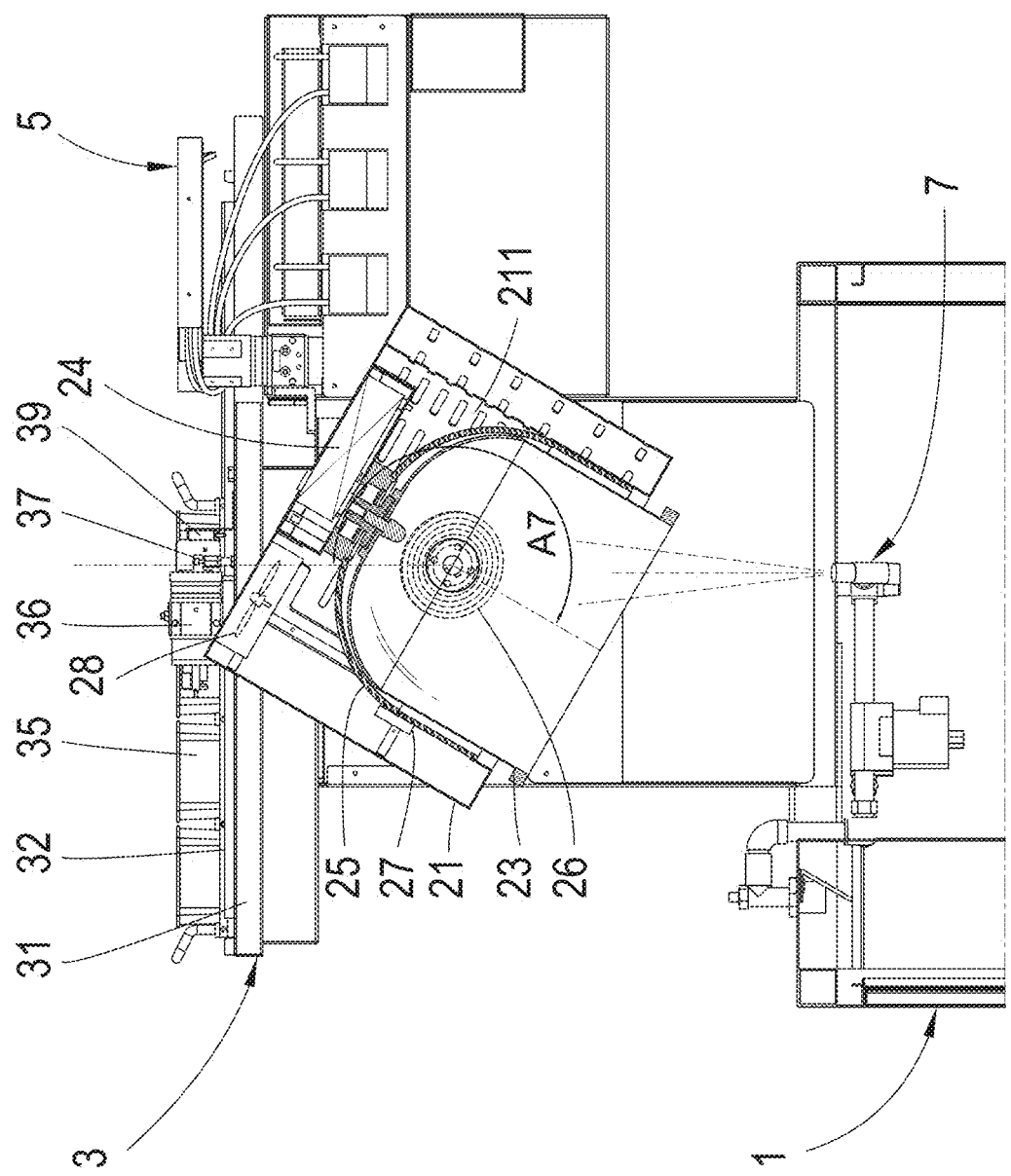

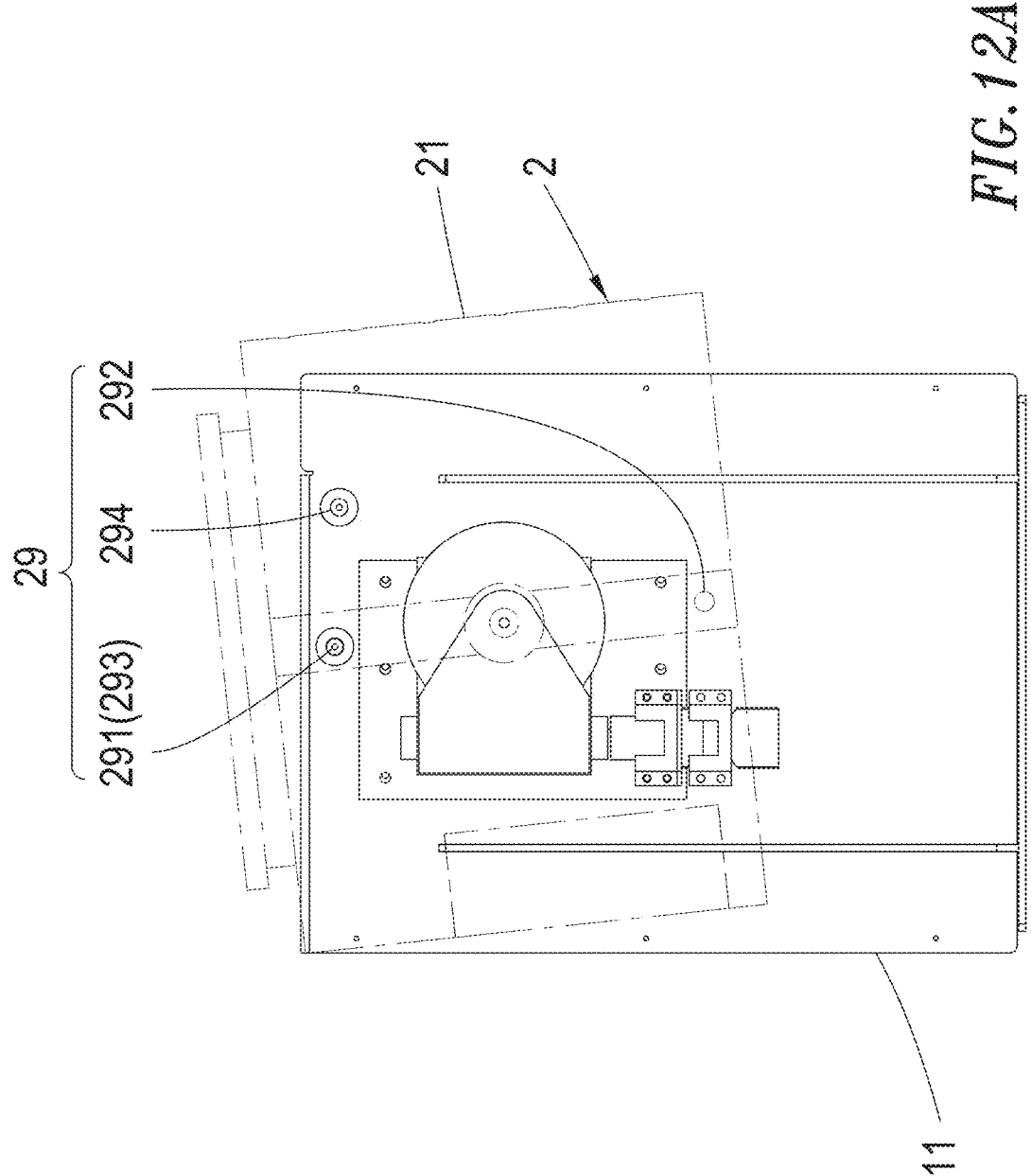

AUTOMATIC MATERIAL POURING DEVICE OF FOOD FRYING MACHINES

BACKGROUND OF THE INVENTION

1. Field of the Invention

The present invention generally relates to an automatic material pouring device for food frying machines; more specifically, it concerns an automatic or semi-automatic equipment for cooking food, and particularly, it is about an equipment structure capable of automatically adding various food ingredients or materials.

2. Description of Related Art

The advancements of science and technologies facilitate significant convenience to human life, and automated equipments also save lots of manpower costs and reduce technical problems which may be incurred because of human labors. In addition, as the population grows and human demands for food increase greatly, in order to ensure the stability of cooking quality, many restaurants and hotels formulate systematic protocols and processes regarding to relevant production processes from the material sources, production steps, proportion allocations, time arrangements and temperature controls, but the standardizations of foods and dishes still need to be completed by the professional chefs. In view of the aforementioned issues, it would be very desirable if a set of automated equipments can be successfully provided and applied so as to complete its systematic production processes and the standardizations of customized dishes thereby saving manpower requirements and improving the production efficiency.

Therefore, by providing equipments which are capable of automatically adding food materials or ingredients and controlling the additions via various optional and automatic settings, it is possible to achieve a food flying machine that can produce a variety of different dishes by means of manual setting assistance, thus effectively completing the solution offered by the automatic material pouring device of the food flying machines according to the present invention.

SUMMARY OF THE INVENTION

The present invention discloses an automatic material pouring device of food flying machines, comprising: a machine body, including at least a support body; a food flying pot, including at least a hollow outer case body mounted on the support body, in which the outer case body is pivotally installed with a servo motor which is used to memorize an adding-material angle in order to control the operating position of the outer case body, and the outer case body is recessively installed with a notch from the outside toward the inside, and the interior of the notch is pivotally installed with an inner flying pot whose bottom is pivotally installed with an inner pot motor, and in which the periphery of the inner flying pot is installed with a heat-resistant support board whose outside is installed in attachment with a heating coil, a temperature sensing device and at least one radiator, and the temperature sensing device is set up to sense the temperature of the outer wall of the inner flying pot through the heat-resistant support board thereby further controlling the temperature of the inner flying pot upon heating it; a material adding device, including a base fixedly installed on the support body, in which a movable seat is installed on the base, and a driven gear is provided on the outside of the movable seat, and the driven gear meshes with a driving gear together such that the driving gear can drive the driven gear to move along with the movable seat, and in which at least one material placement box is placed on the movable seat and is made of a metal material that can be attracted by magnetic force, and the base also includes a feeding cylinder and an attracting device, and the feeding cylinder and the attracting device are conjunctively assembled, and a cylinder sensing device is installed on the two sides of the feeding cylinder, and the cylinder sensing device is electrically connected to the feeding cylinder; and a master controller, respectively connected to the servo motor, the inner pot motor, the heating coil, the temperature sensing device, the radiator, the driving gear, the feeding cylinder as well as the attracting device.

Herein, at least two guide wheels are respectively installed on the edge of the notch opening, a guide board is further arranged on the edge of the notch opening in the outer case body, and the guide board is oppositely located between the two guide wheels.

Herein, wherein the driven gear applies a rack and is embedded on the bottom surface of the movable seat, and the driving gear is installed inside the support body and passes through the base from below so as to mesh with the driven gear.

Herein, a position determination sensor is installed on the base, and the movable seat is openly configured with a plurality of consecutively arranged position holes on the same side as the driven gear, and each of the position holes is used for filling a movable position determination block, and the movable position determination block is allocated in each of the position holes of each track based on different amounts and positions, such that the position determination sensor can memorize different permutations and combinations of each movable position determination block at each position in each of the position holes of the track thereby further distinguishing and determining each position, and each of the material placement boxes is placed above each of the position holes in the corresponding track.

Herein, the attracting device uses at least one electromagnet and, after being energized, the electromagnet can generate a magnetic force to attract and attach to the material placement box.

Herein, a material box sensing device is installed beside the attracting device and is electrically connected to the attracting device.

Herein, the adding-material angle ranges from 5° to 15°.

Herein, the exterior of the outer case body is installed with a position difference sensing device connected to the master controller and applied to sense the start and end positions of the rotation of the outer case body in order to limit the outer case body to operate in this safe angle range, and the position difference sensing device also respectively includes a start position determination block, an end position determination block, a start sensing terminal and an end sensing terminal, in which the start position determination block and the end position determination block are respectively installed on a surface of the exterior of the outer case body in opposition to the support body, and the start sensing terminal and the end sensing terminal are respectively installed on a surface of the exterior of the support body in opposition to the outer case body, such that, when the outer case body rotates, if the start sensing terminal detects the start position determination block, or otherwise the end sensing terminal detects the end position determination block, then the master controller controls the servo motor to stop the rotation operation.

BRIEF DESCRIPTION OF THE DRAWINGS

FIG. 6A shows a cross-section view of the automatic food flying machine according to the present invention, illustrated at its standby angle.

FIG. 6G shows a cross-section view of the automatic food flying machine according to the present invention, illustrated at its pouring angle while located at the pouring-end position.

FIG. 6H shows a cross-section view of the automatic food flying machine according to the present invention, illustrated at its cleaning angle.

FIG. 12A shows a planar view of the outer case body in the automatic food flying machine according to the present invention, illustrated at its start position.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
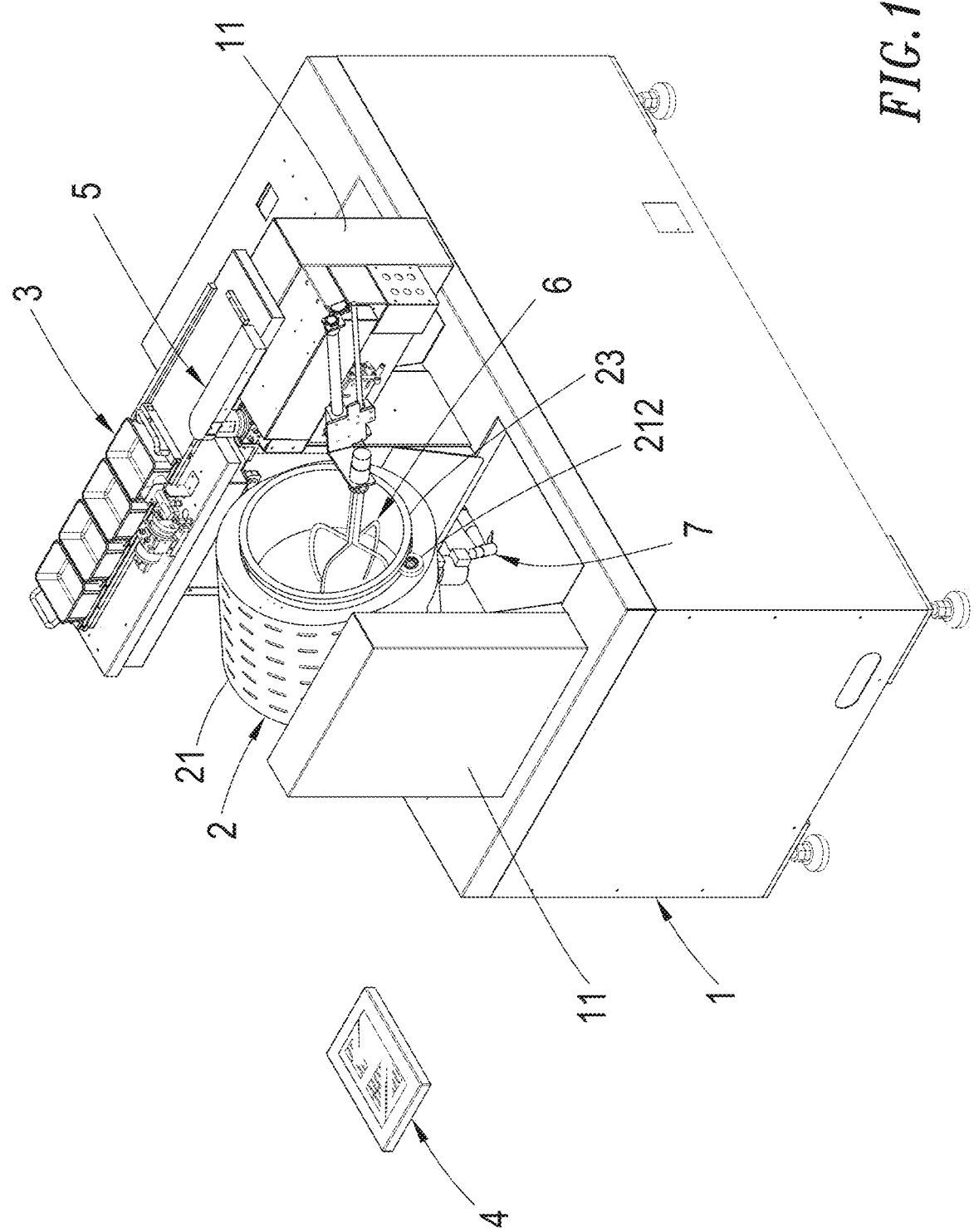
FIG. 1 shows an overall structural stereo view of the automatic food flying machine according to the present invention.

Refer first to FIG. 1, wherein an overall structural stereo view of the automatic material pouring device in the automatic food flying machine according to the present invention is shown, and, as illustrated therein, it comprises a machine body 1, a food flying pot 2, a material adding device 3 and a master controller 4.

Herein the machine body 1 includes at least a support body 11.

Figure 2:
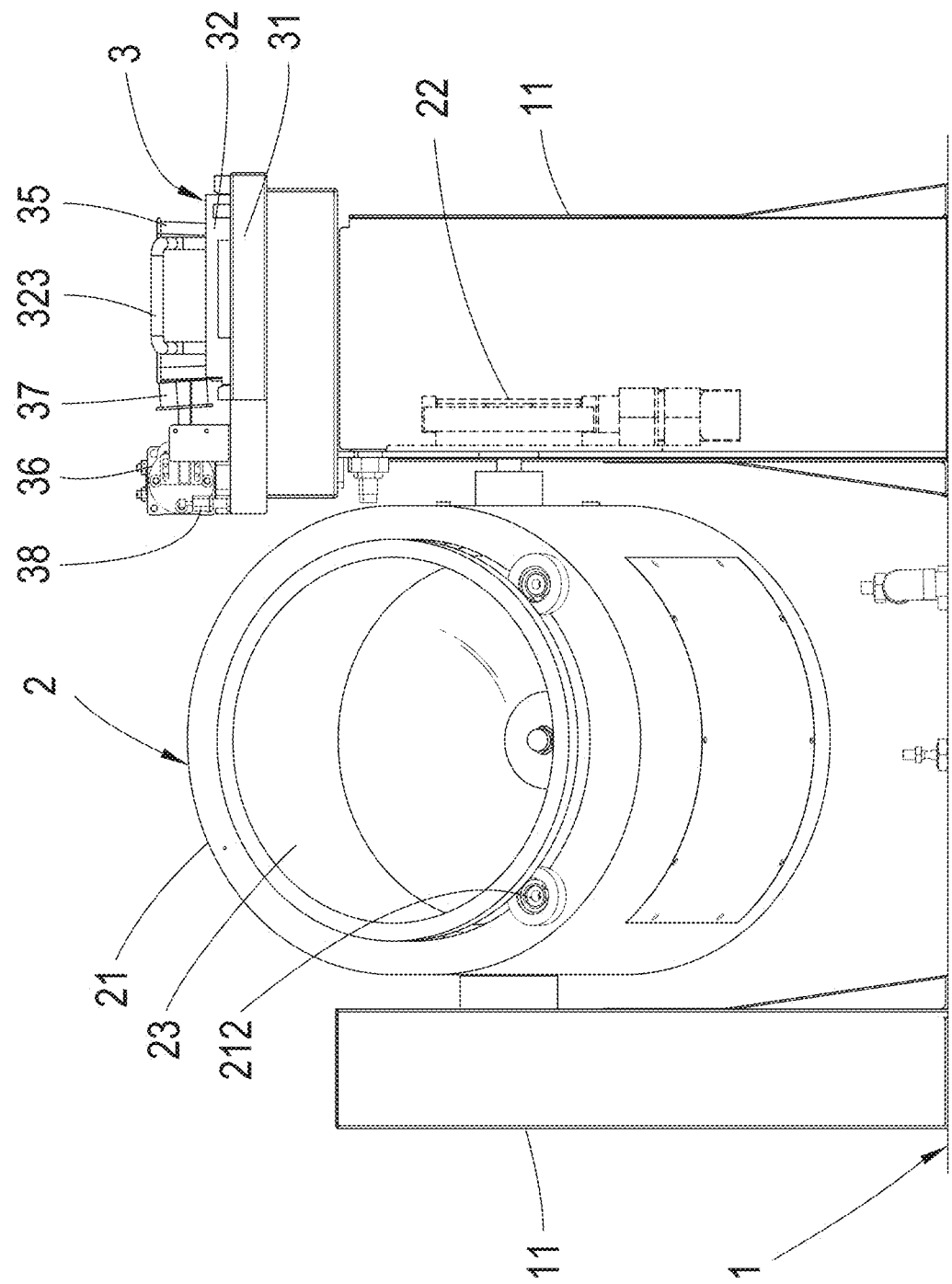
FIG. 2 shows a structural plane view of the food flying pot in the automatic food flying machine according to the present invention.
Figure 3:
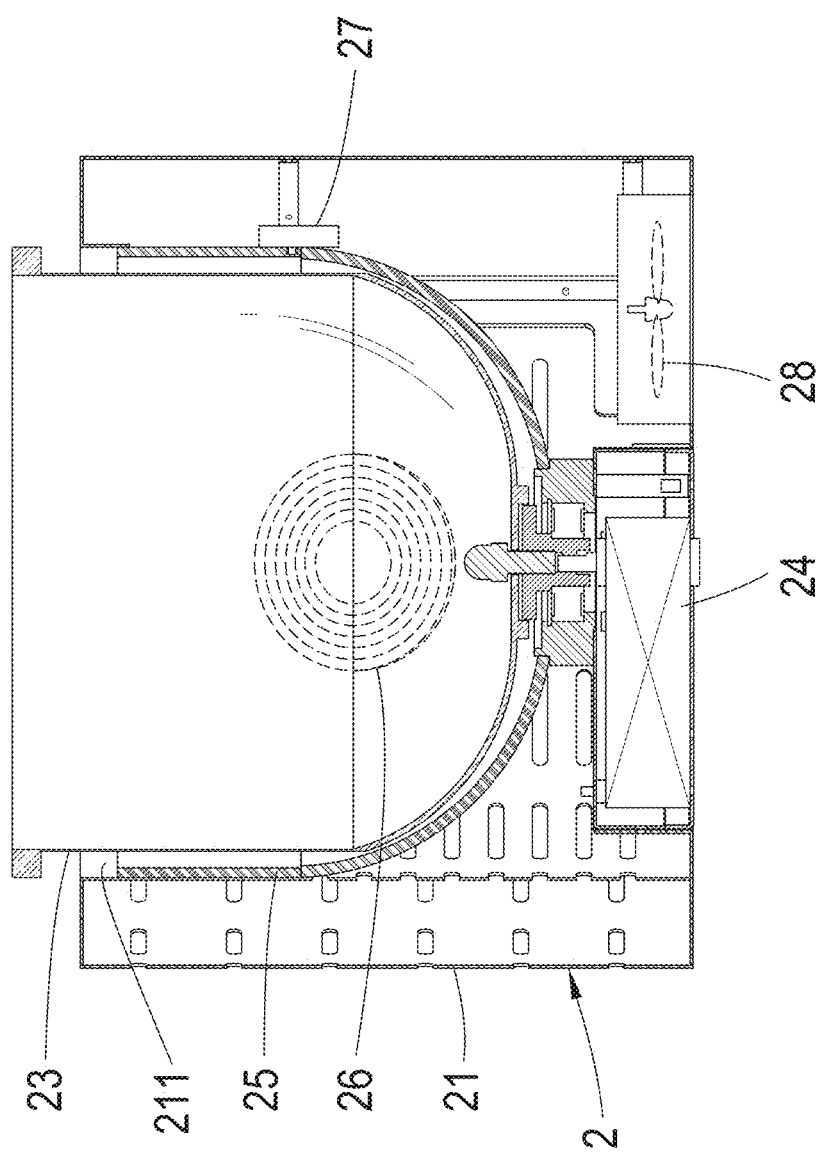
FIG. 3 shows a structural cross-section view of the food flying pot in the automatic food flying machine according to the present invention.

Also, referring conjunctively to FIGS. 1 to 3, the food flying pot 2 has at least a hollow outer case body 21 mounted on the support body 11, and the outer case body 21 is pivotally configured with a servo motor 22; in the present embodiment, the servo motor 22 is installed inside the support body 11 and is used to memorize the rotation angle so as to control the working position of the outer case body 21. It can be seen that the outer case body 21 is recessively installed with a notch 211 from the outside toward the inside, and at least two guide wheels 212 are respectively installed on the edge of the opening of the notch 211; besides, the interior of the notch 211 is pivotally installed with an inner flying pot 23 whose bottom is pivotally installed with an inner pot motor 24 capable of driving the inner flying pot 23 to rotate. In the present embodiment, the inner pot motor 24 is set up at the bottom of the notch 211, and the periphery of the inner flying pot 23 is installed with a heat-resistant support board 25 made of glass materials, and the exterior of the heat-resistant support board 25 is installed in attachment with a heating coil 26, a temperature sensing device 27 and at least one radiator 28. In addition, the temperature sensing device 27 is set up to sense the temperature of the outer wall of the inner flying pot 23 through the heat-resistant support board 25 thereby further controlling the temperature of the inner flying pot 23 upon heating it.

Figure 4:
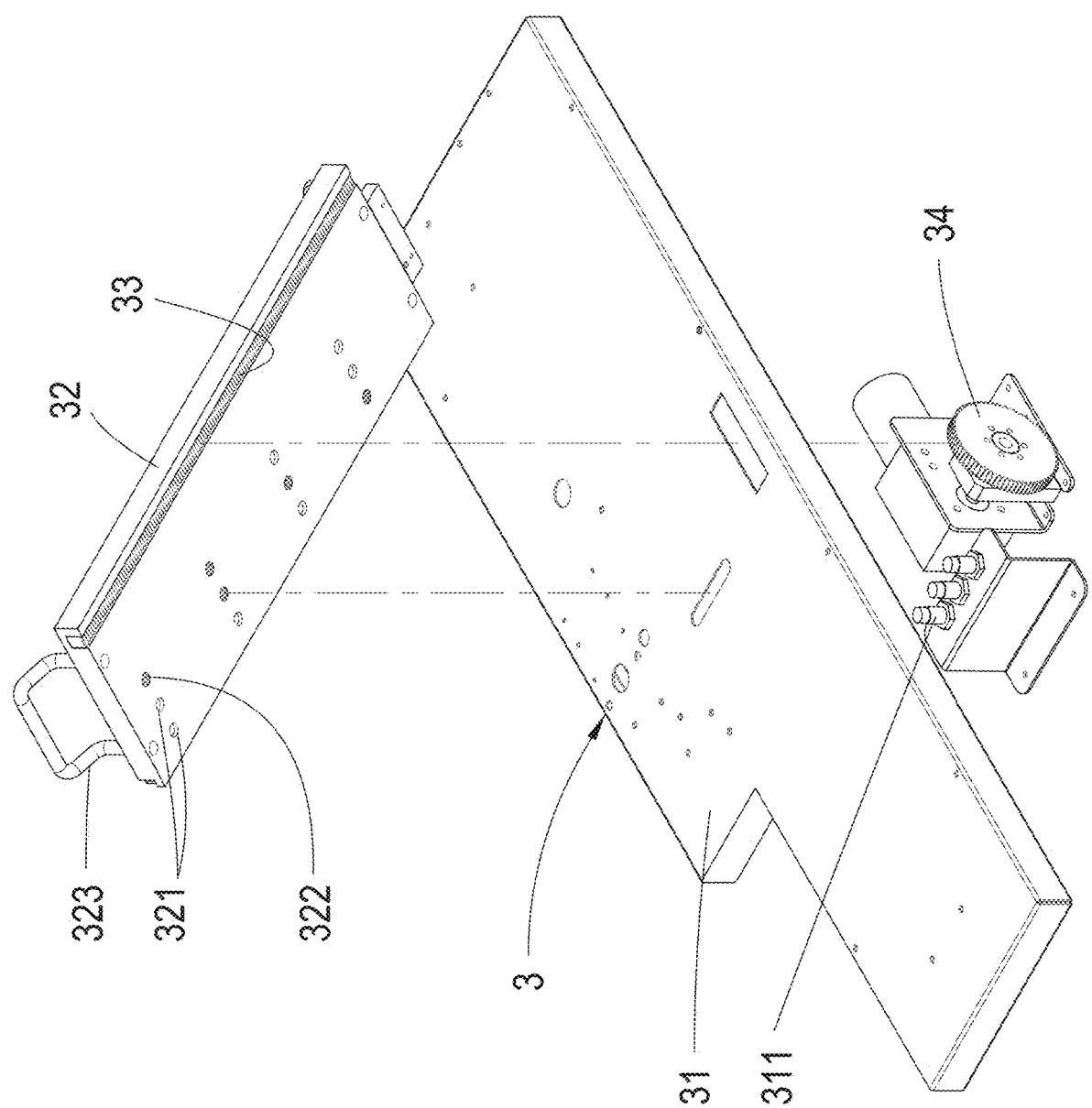
FIG. 4 shows a partial structural stereo disassembled view of the material adding device in the automatic food flying machine according to the present invention.
Figure 5:
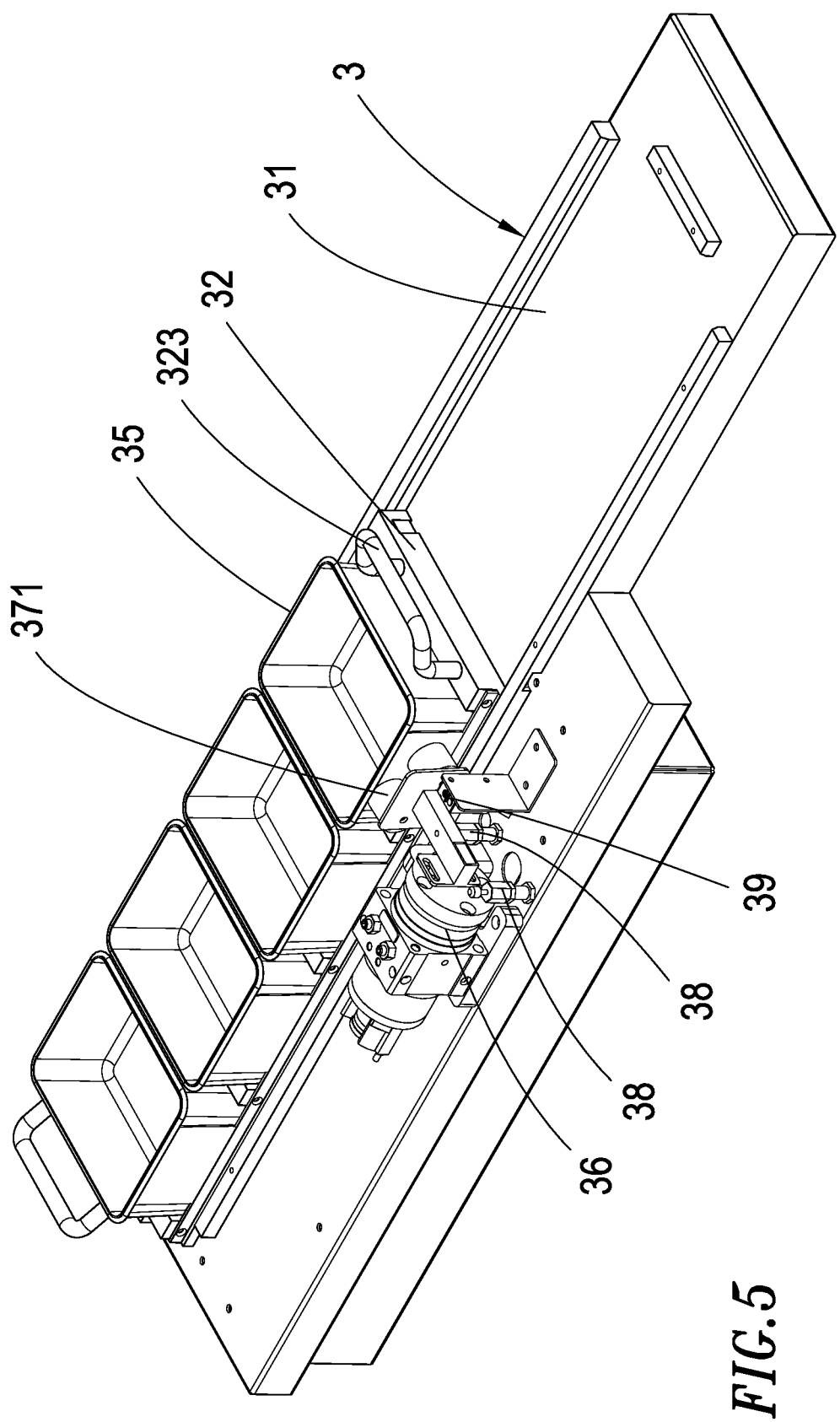
FIG. 5 shows a structural stereo view of the material adding device in the automatic food flying machine according to the present invention.

Referring to FIGS. 1, 4 and 5, the material adding device 3 includes a base 31 fixedly installed on the support body 11, and a movable seat 32 provided on the base 31, and a driven gear 33 is provided at the exterior of the movable seat 32, and the driven gear 33 meshes with a driving gear 34 such that the driving gear 34 can drive the driven gear 33 to move conjunctively with the movable seat 32. In the present embodiment, the driven gear 33 applies a rack and is embedded on the bottom surface of the movable seat 32, and the driving gear 34 is installed inside the support body 11 and passes through the base 31 from below so as to mesh with the driven gear 33, and a position determination sensor 311 is further set up on the base 31. Moreover, the movable seat 32 is further configured with a plurality of consecutively arranged position holes 321 on the same side as the driven gear 33, and each of the position holes 321 is used for filling a movable position determination block 322, and the movable position determination block 322 is allocated in each of the position holes 321 of each track based on different amounts and positions, such that the position determination sensor 311 can distinguish each position. More specifically, the position determination sensor 311 can memorize different permutations and combinations of each movable position determination block 322 at each position in each of the position holes 321 of the track such that, upon detecting, it is possible to acquire the correct position of the movable seat 32 in movement directly by means of each of the position holes 321 in each track. Besides, at least one material placement boxes 35 is placed on the movable seat 32, in which each of such material placement boxes 35 is placed above each of the position holes 321 in the corresponding track, and is made of a metal material that can be attracted by magnetic force. In addition, at least one handle 323 can be installed on the movable seat 32, and a feeding cylinder 36 and an attracting device 37 are installed on the base 31, in which the feeding cylinder 36 is assembled with the attracting device 37, and the attracting device 37 uses at least one electromagnet 371 so that, after being energized, the electromagnet 371 can generate magnetic force to attract and attach to the material placement box 35; meanwhile, the two sides of the feeding cylinder 36 are respectively installed with a cylinder sensing device 38 which is electrically connected to the feeding cylinder 36, and a material box sensing device 39 is installed beside the attracting device 37 and can be electrically connected to the attracting device 37.

Herein the master controller 4 is respectively connected to the servo motor 22, the inner pot motor 24, the heating coil 26, the temperature sensing device 27, the radiators 28, the driving gear 34, the feeding cylinder 36 as well as the attracting device 36 so as to facilitate the controls of the operations of such components and their parameters, and automatic or manual operation modes can be appropriately selected.

Figure 6B:
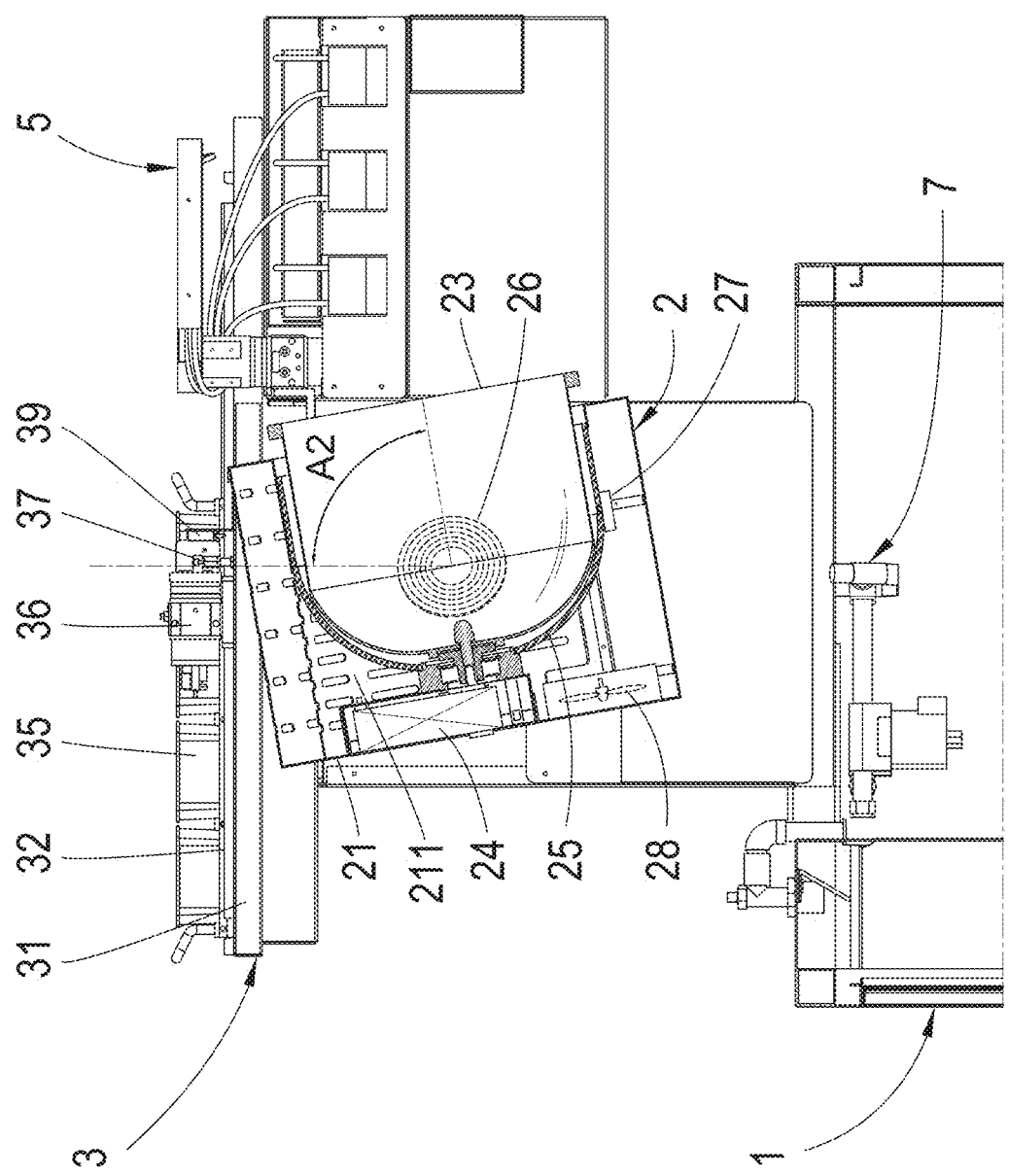
FIG. 6B shows a cross-section view of the automatic food flying machine according to the present invention, illustrated at its heating-pot angle.
Figure 6C:
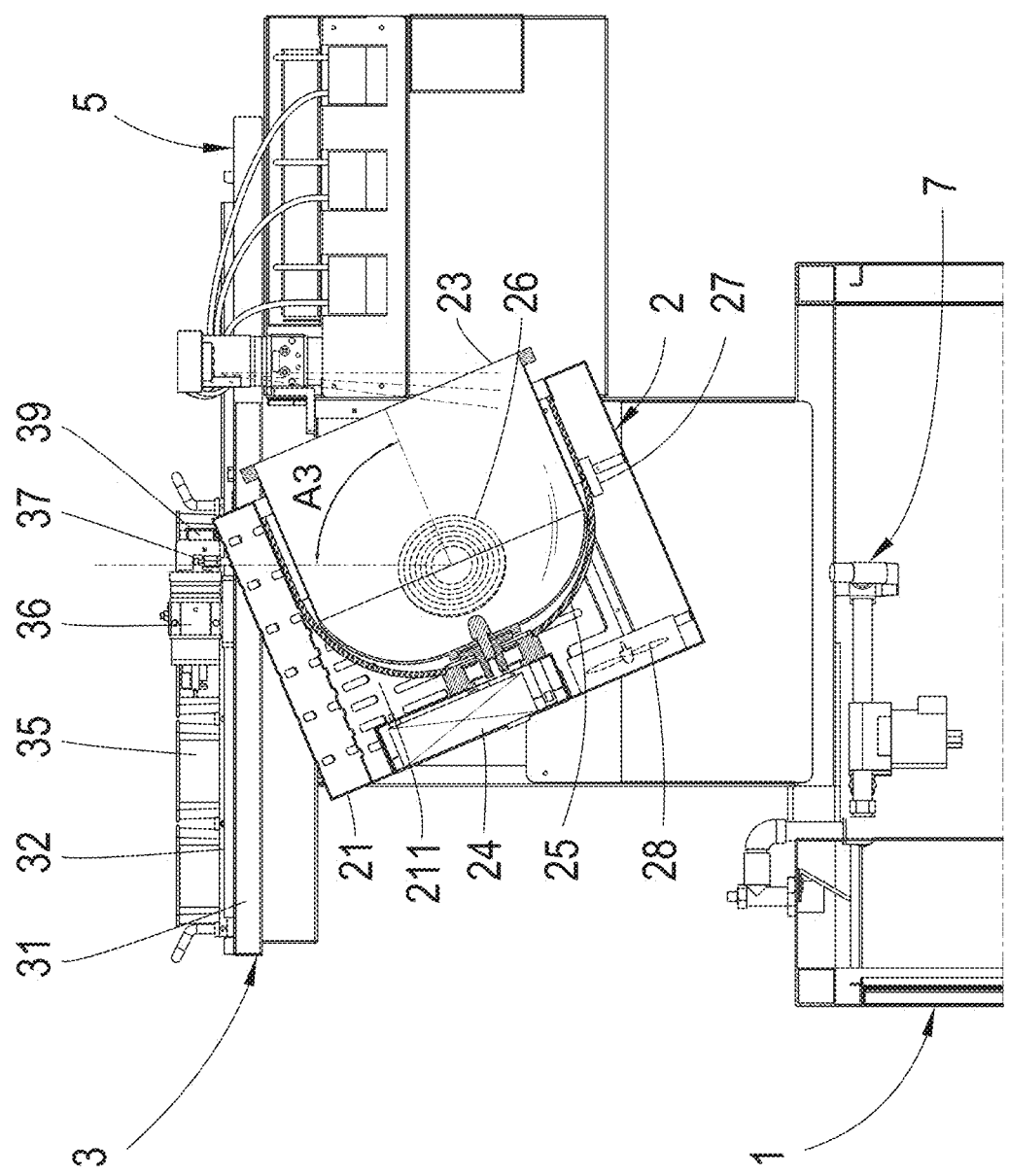
FIG. 6C shows a cross-section view of the automatic food flying machine according to the present invention, illustrated at its adding-edible-fluid angle.
Figure 6D:
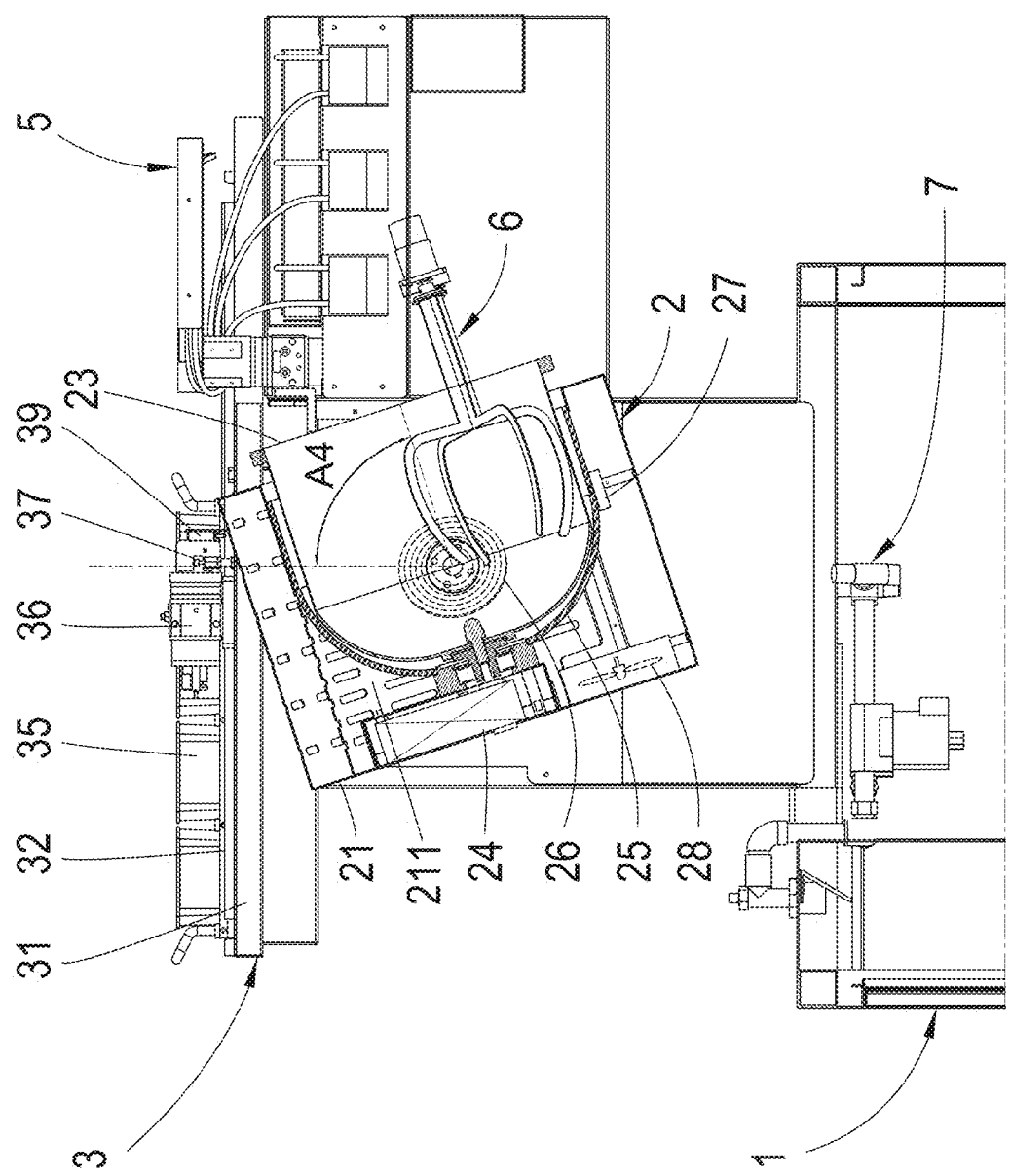
FIG. 6D shows a cross-section view of the automatic food flying machine according to the present invention, illustrated at its stir-frying angle.
Figure 6E:
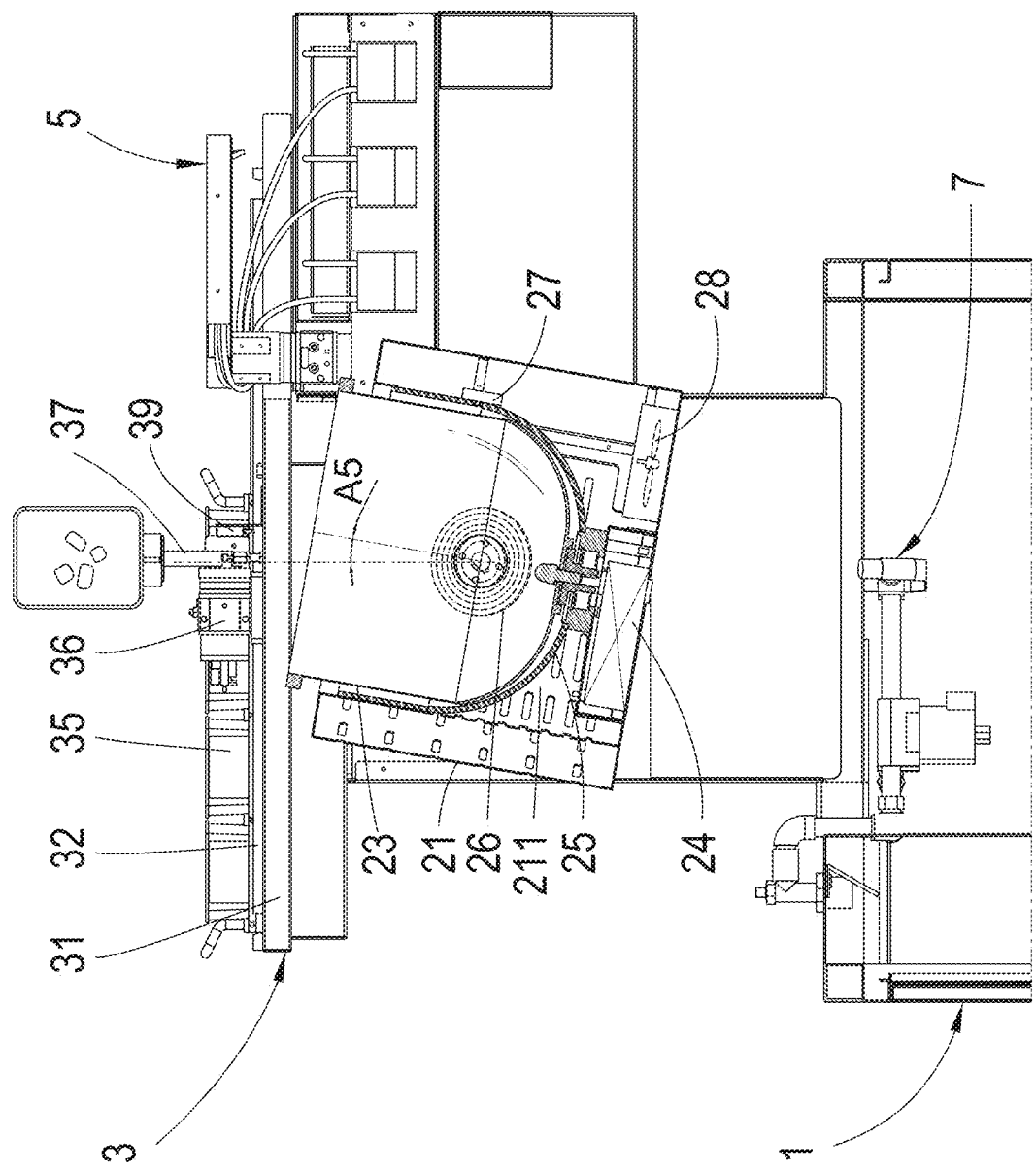
FIG. 6E shows a cross-section view of the automatic food flying machine according to the present invention, illustrated at its adding-food-material angle.

Refer to FIG. 6A, wherein the automatic material pouring device of food flying machines according to the present invention is in the standby condition, and the servo motor 22 stops the outer case body 21 at a standby angle A1 (it should be noticed that the servo motor 22 can memorize the actions of the outer case body 21 corresponding to different angle ranges, and the outer case body 21 is driven by the servo motor 22 to a predetermined angular position all the time; however, for brevity, the following paragraphs will not specifically describe that the outer case body 21 is driven by the servo motor 22.) Then, after activation, refer to FIG. 6B, the outer case body 21 is driven to turn to a Heating-Pot angle A2, and at this angle A2, the inner pot motor 24 and the heating coil 26 will start at the same time such that the heating coil 26 heats the inner frying pot 23 through the heat-resistant support board 25, and the inner frying pot 23 can be rotated by means of the inner pot motor 24 so that the heating can be uniform. Next, refer to FIG. 6C, when the temperature sensing device 27 detects that the inner frying pot 23 reaches a predetermined temperature, the outer case body 21 will turn to an Adding-Edible-Fluid angle A3, in which the edible fluid may be oil, condiments or ingredients such as vinegar, sauce or egg liquid etc., and when the edible fluid is added at angle A3, the inner frying pot motor 24 and the heating coil 26 are still operating at the same time, so the oil is added into the inner frying pot 23 and then the outer case body 21 turns back to the heating-pot angle A2, such that the oil can be continuously heated evenly in the inner frying pot 23, and when the temperature sensing device 27 detects that the inner frying pot 23 and the oil have reached a predetermined temperature, the process of heating the pot is completed. Next, the outer case body 21 is turned to the Adding-Edible-Fluid angle A3 thereby adding the required seasoning in accordance with the needs of the cooking preparations. Taking "Fried Rice" as an example, referring to FIG. 6D, after adding egg liquid, the outer case body 21 is then turned to a Stir-Frying angle A4 to scramble eggs. Referring to FIGS. 6E, 7~9, after a predetermined duration of time, the outer case body 21 is turned to a Adding-Food-Material angle A5 such that, at this angle A5, the driving gear 34 operates to drive the driven gear 33 and the movable seat 32 to moves together, and when the position determination sensor 311 detects each of the position holes 321 corresponding to the designated material placement box 35, the driving gear 34 will be stopped. Next, the material box sensing device 39 will detect whether there is a designated material placement box 35 in the direction corresponding to the attracting device 37 as a second confirmation, and, after this double-check being confirmed, the attracting device 37 is activated in order to allow the electromagnet 371 to attract the designated material placement box 35, and then the feeding cylinder 36 is activates to turn the attracting device 37 at a large angle, thereby pouring the food material held within the material placement box 35 into the inner frying pot 23. Furthermore, when the feeding cylinder 36 turns over, the cylinder sensing devices 38 installed on both sides thereof will be respectively enabled, such that, when the feeding cylinder 36 is touched, the movement direction can be changed thereby allowing the feeding cylinder 36 to repeatedly turn the material placement box 35 back and forth, and such settings can be applied so that, after turning back and forth several times, the material placement box 35 can be put back on the movable seat 2 and release the attracting device 37 to complete the material addition process, thus further returning to the Stir-Frying angle A4 to stir-fry the added rice and eggs (it should be appreciated that the orders, sequences or processes of detailed frying, adding ingredients or materials, and seasoning can be set and determined by the user, which belongs to the technologies outside the field of the present invention, and the descriptions provided in the present embodiment are merely a brief overview). Subsequently, referring to FIGS. 6F and 6G, when the fried rice is completed, the outer case body 21 will be turned to a Pouring angle A6 to pour the fried rice into a container. Finally, referring to FIG. 6H, the outer case body 21 will be turned to a Cleaning angle A7 to wash the inner frying pot 23 clean.

Referring to FIGS. 1 and 5, in the automatic material pouring device of food frying machines according to the present invention, each of the material placement boxes 35 can replace, add or reduce the contents (e.g., solid food materials such as rice, ingredients, etc.) as required, so the user can make different preparations based on different dishes or recipes thereby quite accurately providing various dishes of a stable quality level.

Figure 11:
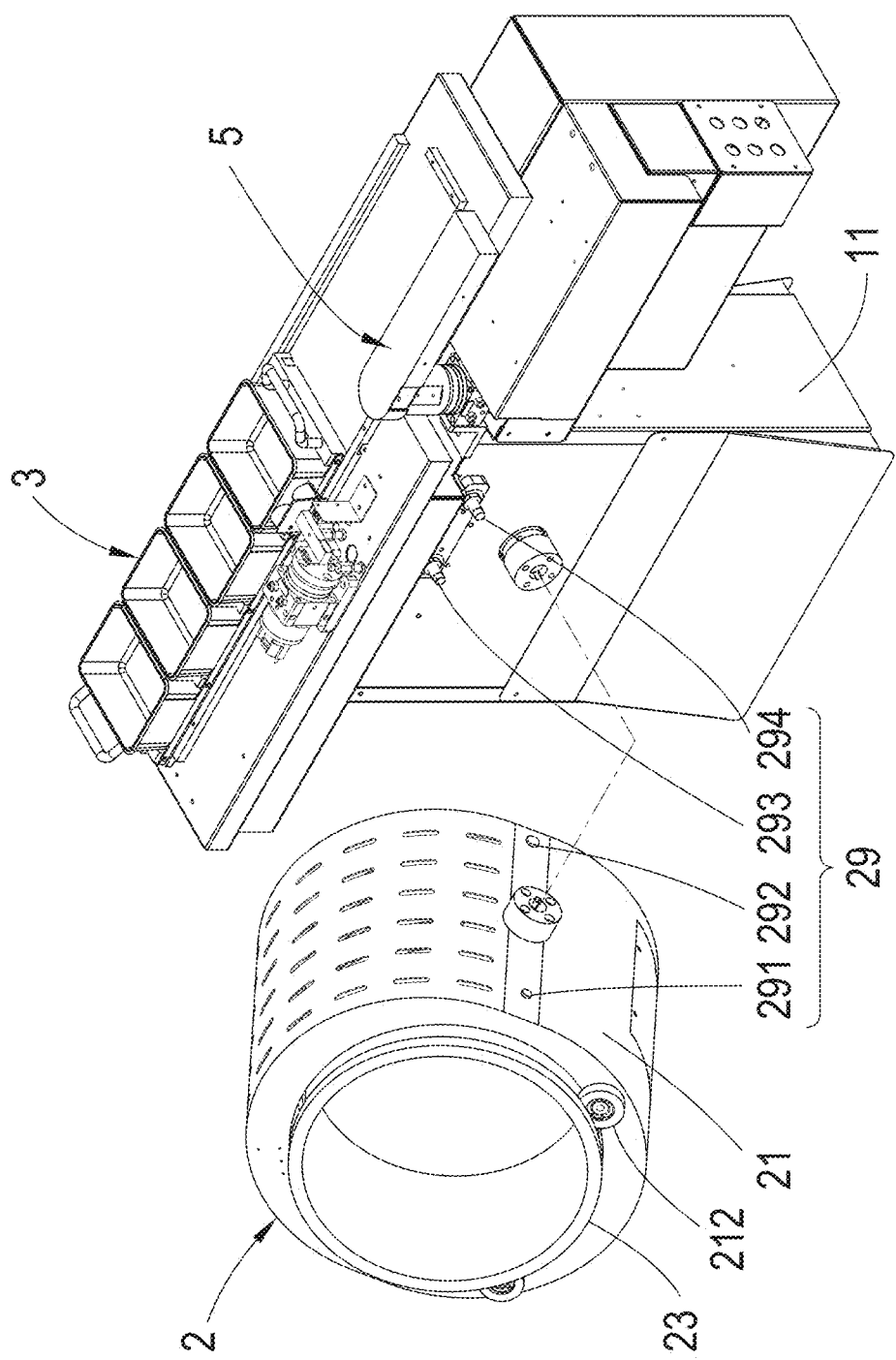
FIG. 11 shows a stereo disassembled view of additionally installing the position difference sensing device in the automatic food flying machine according to the present invention.
Figure 12B:
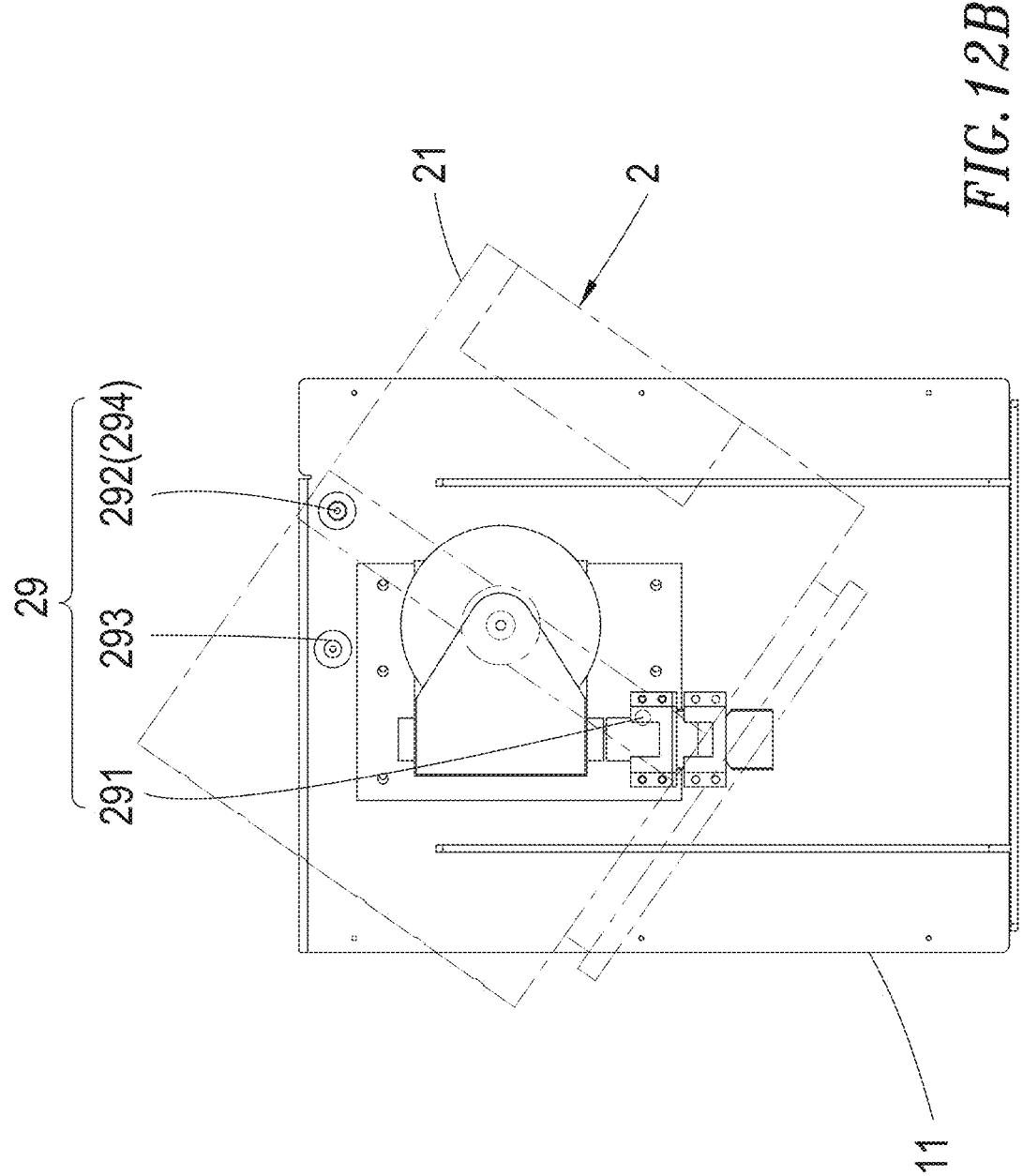
FIG. 12B shows a planar view of the outer case body in the automatic food flying machine according to the present invention, illustrated at its end position.

Moreover, referring to FIGS. 1, 6C, 6D, and 6H, the automatic material pouring device of the food frying machine according to the present invention can be also applied in conjunction with an edible fluid adding device 5, a food frying utensil 6, and a cleaning device 7, in which the edible fluid adding device 5 is applied to, when the outer case body 21 is located at the adding-edible-fluid angle A3, draw the edible fluid (e.g., seasoning or food materials such as oil, vinegar, sauce or egg liquid and so forth) contained in the container into the inner frying pot 23 thereby adding such condiments or food materials to the inner frying pot 23. Then, referring to FIG. 1, the food frying utensil 6 can enter into the inner frying pot 23 to stir-fly food when the outer case body 21 is located at the stir-flying angle A4. Also, referring to FIG. 11, the cleaning device 7 emits a water column into the inner flying pot 23 when the outer case body 21 is located at the cleaning angle A7, then rotating the inner flying pot 23 in conjunction with the inner pot motor 24 to uniformly rinse and wash.

Figure 6F:
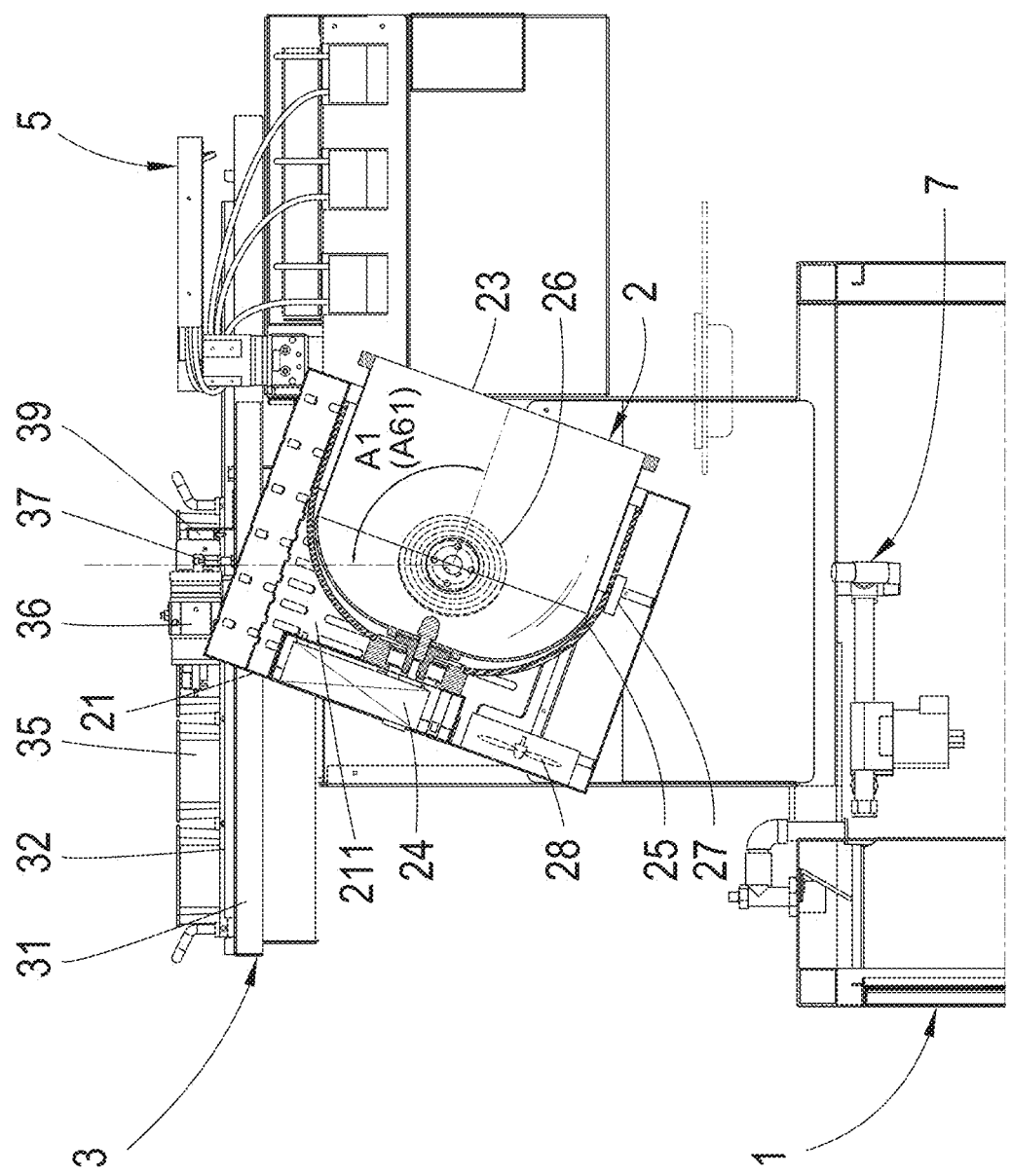
FIG. 6F shows a cross-section view of the automatic food flying machine according to the present invention, illustrated at its pouring angle while located at the pouring-start position.
Figure 7:
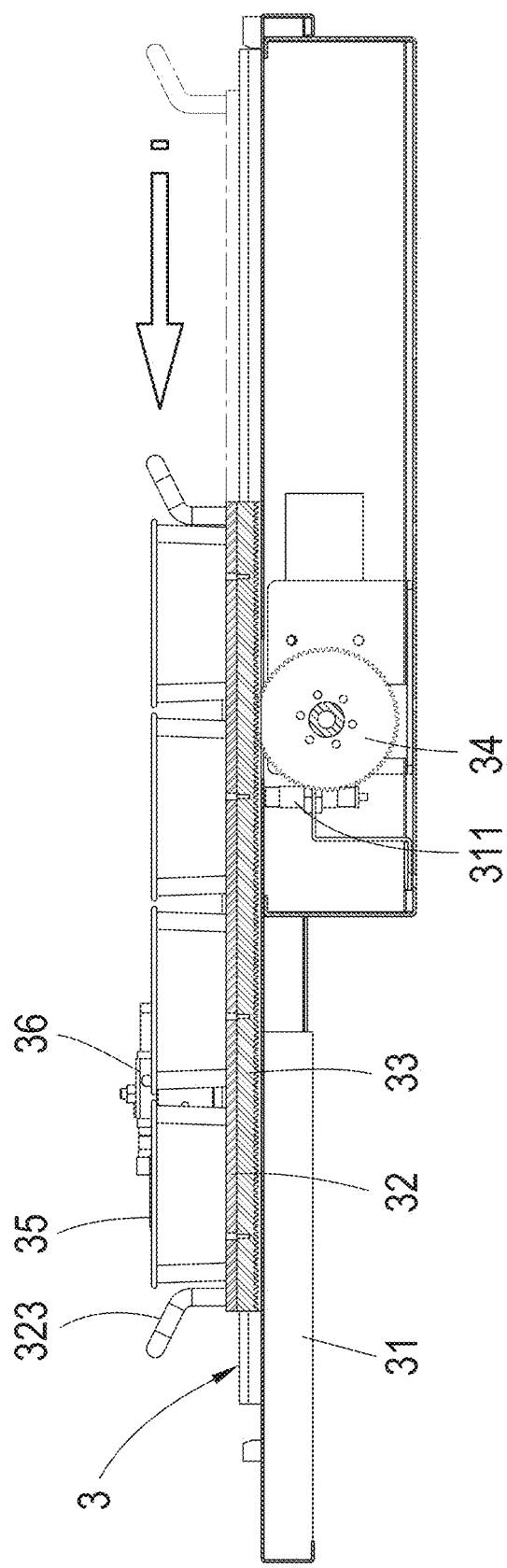
FIG. 7 shows a cross-section view of the implementation for driving the movable board in the automatic food flying machine according to the present invention.
Figure 8:
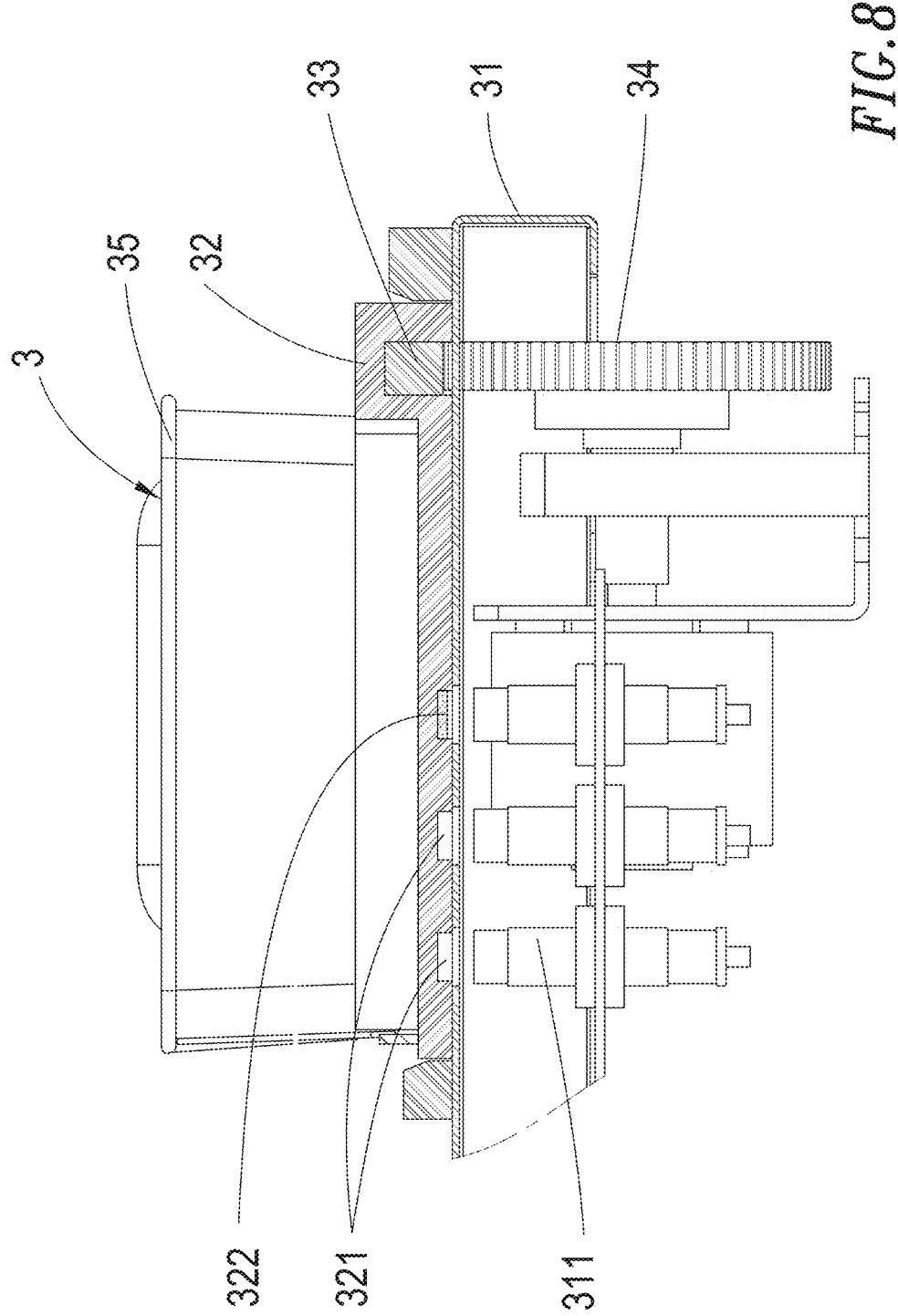
FIG. 8 shows a cross-section view of the implementation for detecting the movable position determination block in the automatic food flying machine according to the present invention.
Figure 9:
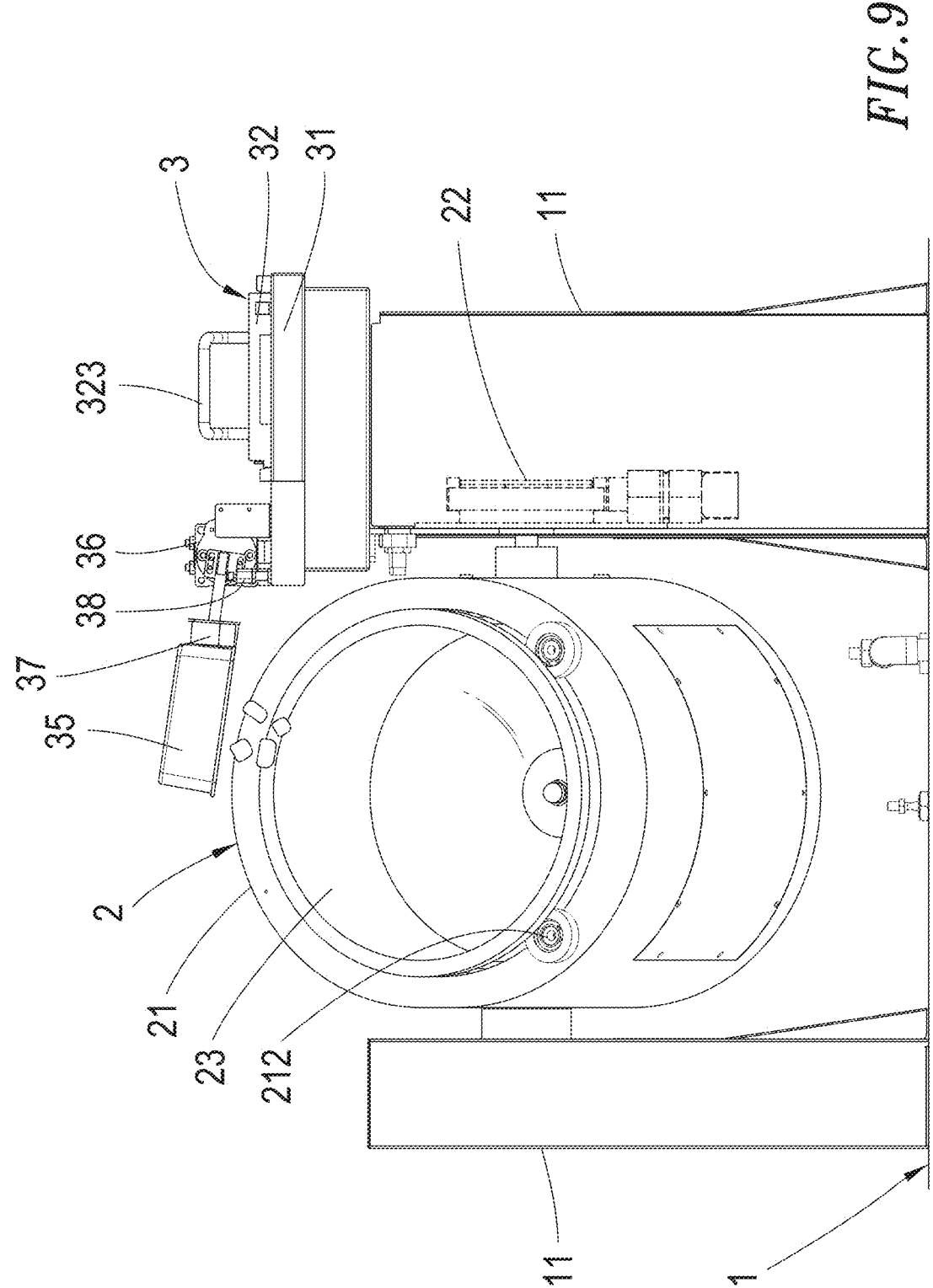
FIG. 9 shows a planar view of the implementation for adding materials in the automatic food flying machine according to the present invention.

Referring to FIGS. 6F and 6G, in the automatic material pouring device of the food frying machine according to the present invention, the pouring angle A6 can be separately configured with a pouring-start position A61 and a pouring-end position A62, so that, upon performing the pouring action, the outer case body 21 will take priority over the pouring-start position A61, and the container for holding the prepared food will be correspondingly placed under the opening of the inner frying pot 23, and then the outer case body 21 will continue to rotate to the pouring-end position A62, and the container for holding the food is also moved together so as to receive the sequentially poured food.

Also refer to FIGS. 6A, 6B, 6C, 6D, 6E, 6F, 6G, and 6H, the following table illustrates the memory in the servo motor 22 for the outer case body 21 being located at various angle ranges in terms of different operation demands, in which each angle includes the Standby angle A1, the Heating-Pot angle A2, the Adding-Edible-Fluid angle A3, the Stir-Frying angle A4, the Adding-Food-Material angle A5, the Pouring-angle A6 and the cleaning angle A7, and each angle is calculated with respect to the outer case body 21 arranged in a vertical state as 0 degree; the list of actions corresponding to each angle is shown below:

determination block 292 are individually installed on the surfaces of the exterior of the outer case body 21 opposite to the support body 11, while the start sensing terminal 293 and the end sensing terminal 294 are individually installed on the surfaces of the exterior of the support body 11 opposite to the outer case body 21, such that, when the outer case body 21 rotates, if the start sensing terminal 293 detects the start position determination block 291 or alternatively the end sensing terminal 294 detects the end position determination block 292, then the master controller 4 controls the servo motor 22 to stop the rotation operation. In the present embodiment, it can be seen that, when the start sensing terminal 293 detects the start position determination block 291, the outer case body 21 is at the position of 8°, and, on the other hand, when the end sensing terminal 294 detects the end position determination block 292, the outer case body 21 is at the position of 215°, indicating that the safe angle range of the outer case body 21 is between 8°~215°, and since the outer case body 21 is restricted to fall within such a start/end angle range, the outer case body 21 can only return to the standby position by way of the reverse rotation approach so as to prevent continuous rotation actions which may adversely lead to coil or wire winding issues.

Figure 13:
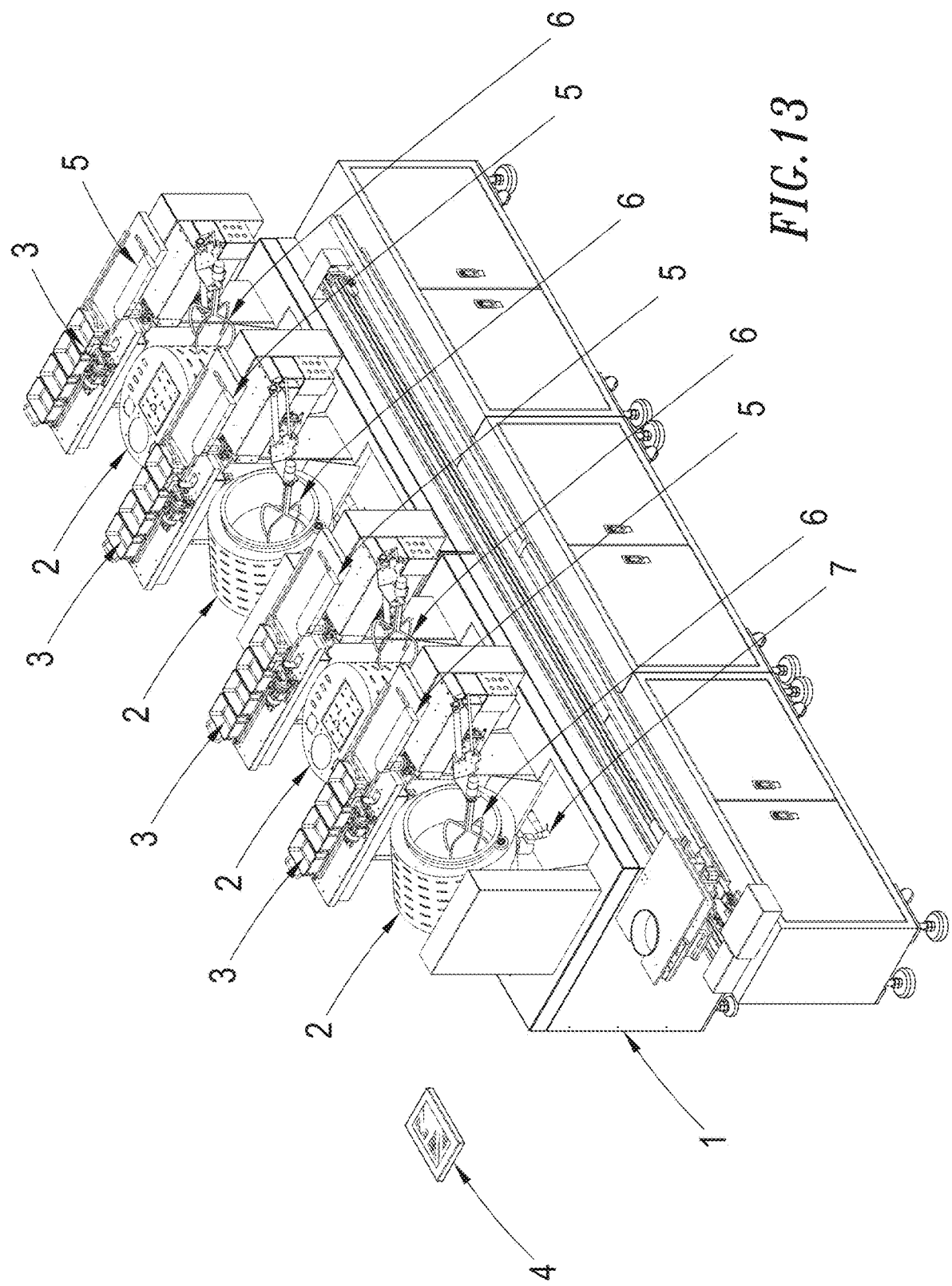
FIG. 13 shows a structural stereo view for a collective configuration of plural sets of the automatic food flying machines according to the present invention.

Moreover, referring to FIG. 13, the food frying pot 2, the material adding device 3, the edible fluid adding device 5, the food flying utensil 6 and the cleaning device 7 of the automatic material pouring device of the food flying

| Symbol | Range of Angle | Best Angle | Action |
|---|---|---|---|
| A1 | 61.5°, 62.5°, 63.5°, 64.5°, 65.5°, 66.5°, 67.5°, 68.5°, 69.5°, 70.5°, 71.5° | 66.5° | Standby |
| A2 | 75°, 76°, 77°, 78°, 79°, 80°, 81°, 82°, 83°, 84°, 85° | 80° | Heating-Pot |
| A3 | 62°, 63°, 64°, 65°, 66°, 67°, 68°, 69°, 70°, 71°, 72° | 67° | Adding-Edible-Fluid |
| A4 | 67°, 68°, 69°, 70°, 71°, 72°, 73°, 74°, 75°, 76°, 77° | 72° | Stir-Frying |
| A5 | 5°, 6°, 7°, 8°, 9°, 10°, 11°, 12°, 13°, 14°, 15° | 10° | Add-Food-Material |
| A6 | 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139°, 140°, 141°, 142°, 143°, 144°, 145°, 146°, 147°, 148°, 149°, 150°, 151°, 152° | | Pouring |
| A61 | 110°, 111°, 112°, 113°, 114°, 115°, 116°, 117°, 118°, 119°, 120° | 110° | Pouring-Start Position |
| A62 | 142°, 143°, 144°, 145°, 146°, 147°, 148°, 149°, 150°, 151°, 152° | 152° | Pouring-End Position |
| A7 | 205°, 206°, 207°, 208°, 209°, 210°, 211°, 212°, 213°, 214°, 215° | 210° | Cleaning |

Figure 10:
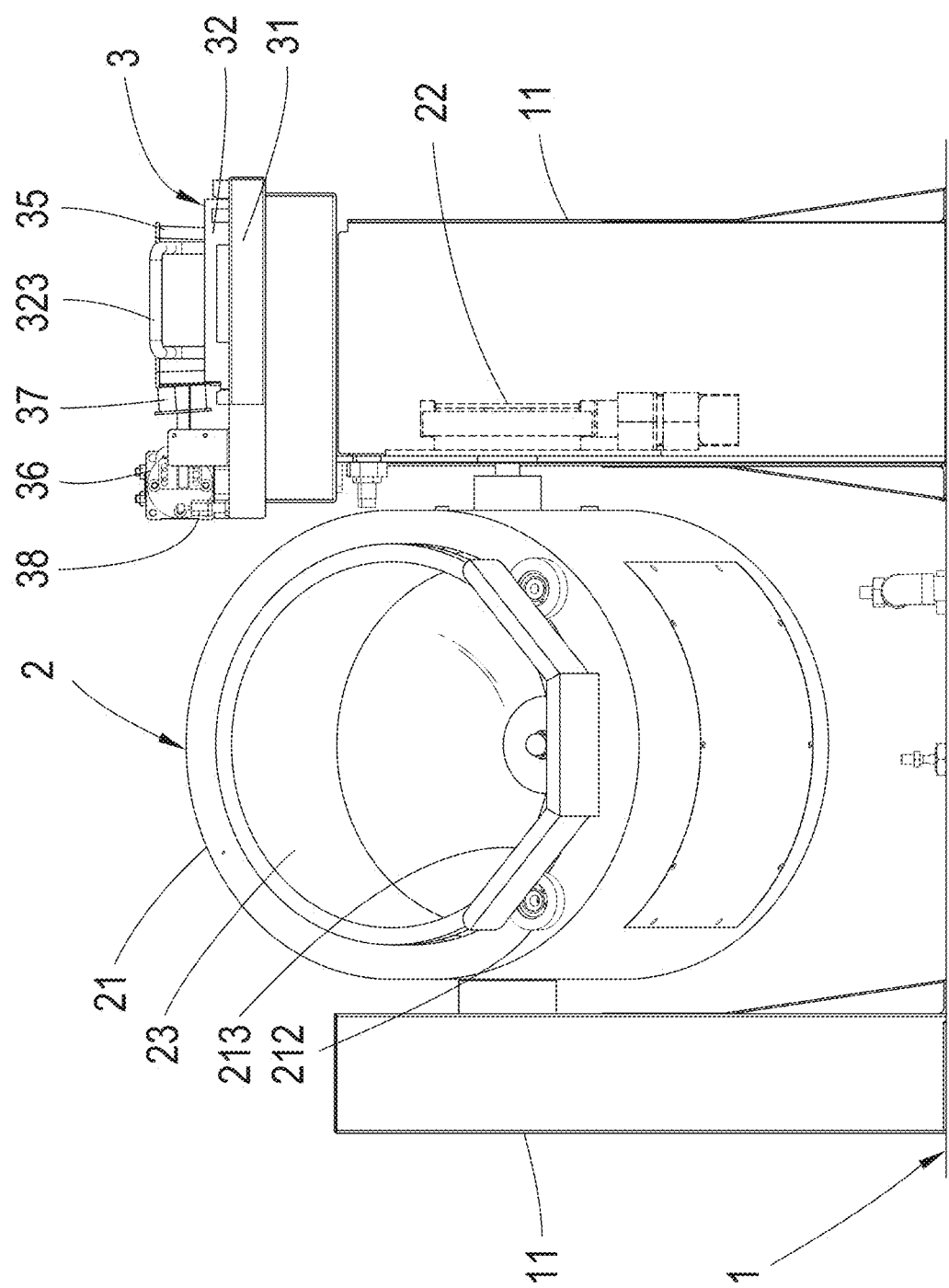
FIG. 10 shows a planar view of additionally installing the guild board in the automatic food flying machine according to the present invention.

Furthermore, referring to FIG. 10, in the automatic material pouring device of the food flying machine according to the present invention, a guide board 213 may be further installed at the edge of the opening of the notch 211 in the outer case body 21 and is oppositely located between the two guide wheels 212.

Now refer to FIGS. 2, 11, 12A, and 12B, wherein, in the automatic material pouring device of food flying machines according to the present invention, a position difference sensing device 29 connected to the master controller 4 may be installed at the exterior of the outer case body 21 and can be used to detect the positions of the initial and final rotation points of the outer case body 21 thereby limiting the movement of the outer case body 21 within a safe angle range. The aforementioned position difference sensing device 29 includes a start position determination block 291, an end position determination block 292, a start sensing terminal 293 and an end sensing terminal 294, in which the start position determination block 291 and the end position machine according to the present invention can be integrally installed together with multiple sets on one machine body 1 to enhance the overall production efficiency.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alterations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:
1. An automatic material pouring device of food frying machines, comprising:
  a machine body, including at least a support body;

a food frying pot, including at least a hollow outer case body mounted on the support body, in which the outer case body is pivotally installed with a servo motor which is used to memorize an adding-material angle in order to control the operating position of the outer case body, and the outer case body is recessively installed with a notch from the outside toward the inside, and the interior of the notch is pivotally installed with an inner frying pot whose bottom is pivotally installed with an inner pot motor;

a material adding device, including a base fixedly installed on the support body, in which a movable seat is installed on the base, and a driven gear is provided on the outside of the movable seat, and the driven gear meshes with a driving gear together such that the driving gear can drive the driven gear to move along with the movable seat, and in which at least one material placement box is placed on the movable seat and is made of a metal material that can be attracted by magnetic force, and the base also includes a feeding cylinder and an attracting device, and the feeding cylinder and the attracting device are conjunctively assembled; and a master controller, respectively connected to the servo motor, the inner pot motor, the driving gear, the feeding cylinder as well as the attracting device, wherein the exterior of the outer case body is installed with a position difference sensing device connected to the master controller and applied to sense the start and end positions of the rotation of the outer case body in order to limit the outer case body to operate in this safe angle range, and the position difference sensing device also respectively includes a start position determination block, an end position determination block, a start sensing terminal and an end sensing terminal, in which the start position determination block and the end position determination block are respectively installed on a surface of the exterior of the outer case body in opposition to the support body, and the start sensing terminal and the end sensing terminal are respectively installed on a surface of the exterior of the support body in opposition to the outer case body, such that, when the outer case body rotates, if the start sensing terminal detects the start position determination block, or otherwise the end sensing terminal detects the end position determination block, then the master controller controls the servo motor to stop the rotation operation.

2. The automatic material pouring device of food frying machines according to claim 1, wherein at least two guide wheels are respectively installed on the edge of the notch opening, a guide board is further arranged on the edge of the notch opening in the outer case body, and the guide board is located between the two guide wheels.

3. The automatic material pouring device of food frying machines according to claim 1, wherein the driven gear applies a rack and is embedded on the bottom surface of the movable seat, and the driving gear is installed inside the support body and passes through the base from below so as to mesh with the driven gear.

4. The automatic material pouring device of food frying machines according to claim 1, wherein a position determination sensor is installed on the base, and the movable seat is openly configured with a plurality of consecutively arranged position holes on the same side as the driven gear, and each of the position holes is used for filling a movable position determination block, and the movable position determination block is allocated in each of the position holes of each track based on different amounts and positions, such that the position determination sensor can memorize different permutations and combinations of each movable position determination block at each position in each of the position holes of the track thereby further distinguishing and determining each position, and each of the material placement boxes is placed above each of the position holes in the corresponding track.

5. The automatic material pouring device of food frying machines according to claim 1, wherein the attracting device uses at least one electromagnet and, after being energized, the electromagnet can generate a magnetic force to attract and attach to the material placement box.

6. The automatic material pouring device of food frying machines according to claim 1, wherein the adding-material angle ranges from 5° to 15°.

* * * * *